US009237256B2

(12) United States Patent
Tanaka

(10) Patent No.: US 9,237,256 B2
(45) Date of Patent: Jan. 12, 2016

(54) DOCUMENT READING APPARATUS AND IMAGE PROCESSING METHOD

(71) Applicant: CANON KABUSHIKI KAISHA, Tokyo (JP)

(72) Inventor: Shigeto Tanaka, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/932,478

(22) Filed: Jul. 1, 2013

(65) Prior Publication Data

US 2014/0009802 A1 Jan. 9, 2014

(30) Foreign Application Priority Data

Jul. 4, 2012 (JP) ................................. 2012-150465

(51) Int. Cl.
H04N 1/04 (2006.01)
H04N 1/38 (2006.01)
H04N 1/409 (2006.01)

(52) U.S. Cl.
CPC .................................. *H04N 1/4097* (2013.01)

(58) Field of Classification Search
CPC ....... H04N 1/409; H04N 1/4097; H04N 1/40; H04N 1/40056; G06T 5/20
USPC ......... 358/461, 463, 465, 496, 498, 474, 505; 382/274, 275
See application file for complete search history.

(56) References Cited

U.S. PATENT DOCUMENTS

| 5,608,547 | A | * | 3/1997 | Nakatani et al. | 358/505 |
| 5,969,371 | A | * | 10/1999 | Andersen et al. | 250/559.15 |
| 6,438,271 | B1 | * | 8/2002 | Usami et al. | 382/274 |
| 7,119,926 | B2 | * | 10/2006 | Takeda et al. | 358/1.9 |
| 7,349,108 | B2 | * | 3/2008 | Ito | 358/1.12 |
| 7,525,703 | B2 | * | 4/2009 | Yasuda | 358/521 |
| 7,558,437 | B2 | * | 7/2009 | Misaka | 382/275 |
| 7,777,918 | B2 | * | 8/2010 | Sekizawa et al. | 358/3.26 |
| 7,782,503 | B2 | * | 8/2010 | Ishido et al. | 358/498 |
| 7,813,005 | B2 | * | 10/2010 | Arai | 358/2.1 |
| 8,467,108 | B2 | * | 6/2013 | Shimatani | 358/461 |
| 8,520,271 | B2 | * | 8/2013 | Nishio | 358/475 |
| 8,749,850 | B2 | * | 6/2014 | Ikegawa | 358/3.26 |
| 8,837,018 | B2 | * | 9/2014 | Matsui | 358/498 |
| 2005/0206968 | A1 | | 9/2005 | Sodeura et al. | |

FOREIGN PATENT DOCUMENTS

| CN | 1471300 A | 1/2004 |
| CN | 101247462 A | 8/2008 |
| JP | S62-099778 A | 5/1987 |
| JP | 2000-050023 A | 2/2000 |
| JP | 2005-045462 A | 2/2005 |
| JP | 2012-044371 A | 3/2012 |

* cited by examiner

Primary Examiner — Cheukfan Lee
(74) Attorney, Agent, or Firm — Canon U.S.A., Inc., IP Division

(57) ABSTRACT

A document reading apparatus includes a reading unit configured to read the document being conveyed at a reading position, a white member disposed opposite to the reading position, a reference value determination unit configured to determine a reference value from an output value of the reading unit obtained when the reading unit reads the white member, a detection unit configured to detect a shadow generated by a leading edge of the document from the reference value and an output value of the reading unit obtained before the leading edge of the document is conveyed, a streak pixel position determination unit configured to determine a streak pixel position from an output value of the reading unit corresponding to a position of the document which is determined based on a detection result by the detection unit, and a correction unit configured to perform a streak correction based on the streak pixel position.

13 Claims, 16 Drawing Sheets

801 — | 0 0 0 0 · · · 0 0 0 1 0 0 0 · · · 0 0 0 0 0 0 |
802 — | 0 0 0 0 · · · 0 0 1 0 0 0 0 · · · 0 0 0 0 0 0 |
803 — | 0 0 0 0 · · · 0 0 1 0 0 0 0 · · · 0 0 0 0 0 0 |

MAIN SCANNING POSITION [PIXEL]

901 — | 0 0 0 0 · · · 0 0 0 1 0 0 0 · · · 0 0 0 0 0 0 |
902 — | 0 0 0 0 · · · 0 0 1 1 0 0 0 · · · 0 0 0 0 0 0 |
903 — | 0 0 0 0 · · · 0 0 1 1 0 0 0 · · · 0 0 0 0 0 0 |

MAIN SCANNING POSITION [PIXEL]

1001 — | 0 0 0 0 · · · 0 0 0 1 0 0 0 · · · 0 0 0 0 0 0 |
1002 — | 0 0 0 0 · · · 0 0 1 1 1 0 0 · · · 0 0 0 0 0 0 |
1003 — | 0 0 0 0 · · · 0 0 1 1 1 0 0 · · · 0 0 0 0 0 0 |

MAIN SCANNING POSITION [PIXEL]

MAIN SCANNING POSITION [PIXEL]

MAIN SCANNING POSITION [PIXEL]

MAIN SCANNING POSITION [PIXEL]

DOCUMENT READING APPARATUS AND IMAGE PROCESSING METHOD

BACKGROUND OF THE INVENTION

1. Field of the Invention

The present invention relates to a technique for performing a streak correction on image data of a document.

2. Description of the Related Art

Image reading apparatuses using an automatic document feeder are known. The image reading apparatuses using the automatic document feeder convey documents placed on a document tray one by one, and at the same time, read an image of the conveyed document at a reading position. These image reading apparatuses read an image at the unchanged reading position, and, therefore, are subject to generation of a streak in a read image when dust, such as paper dust, dirt, and motes, carried by the document conveyance is attached on the reading position.

An image reading apparatus discussed in Japanese Patent Application Laid-Open No. 2005-45462 acquires read data when a document does not pass through a reading position yet, read data of a leading edge portion and a trailing edge portion of the document, and read data of a main area (an area other than the leading edge portion and the trailing edge portion) of the document. Then, if all of the pieces of read data contain pixels having the same density at a certain pixel position along a conveyance direction of the document (hereinafter referred to as a sub-scanning direction), the image reading apparatus detects a pixel at the certain pixel position as a streak pixel based on dust attached on the reading position. Hereinafter, in the present disclosure, a streak pixel based on dust will be simply referred to as a streak pixel.

According to the apparatus discussed in Japanese Patent Application Laid-Open No. 2005-45462, dust hidden at the back side of the document does not appear as a streak in the read image when the leading edge portion and the trailing edge portion of the document pass through the reading position. Therefore, a matching result cannot be acquired from a comparison between the density when the document does not pass through the reading position, and the density when the document passes through the reading position. As a result, such dust is not detected as a streak pixel. On the other hand, dust unhidden at the back side of the document appears as a streak in the read image, whereby a matching result can be acquired from the comparison between the density when the document does not pass through the reading position, and the density when the document passes through the reading position. As a result, the dust is detected as a streak pixel.

SUMMARY OF THE INVENTION

According to an aspect of the present invention, a document reading apparatus includes a conveyance unit configured to convey a document, a reading unit configured to read the document being conveyed by the conveyance unit at a reading position, an illumination unit configured to illuminate the reading position, a white member disposed opposite to the reading position, a reference value determination unit configured to determine a reference value from an output value of the reading unit obtained when the reading unit reads the white member, a detection unit configured to detect a shadow generated by a leading edge of the document from the reference value and an output value of the reading unit obtained before the leading edge of the document is conveyed by the conveyance unit, a streak pixel position determination unit configured to determine a streak pixel position from an output value of the reading unit corresponding to a position of the document in a conveyance direction of the document, which is determined based on a detection result by the detection unit, and a correction unit configured to perform a streak correction on an output value of the reading unit based on the streak pixel position.

According to another aspect of the present invention, a document reading apparatus includes a conveyance unit configured to convey a document, a reading unit configured to read the document being conveyed by the conveyance unit at a reading position, an illumination unit configured to illuminate the reading position, a white member disposed opposite to the reading position, a first streak pixel candidate determination unit configured to determine a first streak pixel candidate from an output value of the reading unit obtained when the reading unit reads the white member, a second streak pixel candidate determination unit configured to determine a second streak pixel candidate from an output vale of the reading unit obtained when the reading unit reads the document, a determination unit configured to determine a streak pixel position based on the first streak pixel candidate and the second streak pixel candidate, and a correction unit configured to perform a streak correction on an output value of the reading unit based on the streak pixel position. The determination unit determines the streak pixel position based on a position of the first streak pixel candidate and a position of the second streak pixel candidate. Even if a streak position of the first streak pixel candidate and a streak position of the second streak pixel candidate are different from each other, as long as a difference between the streak position of the first streak pixel candidate and the streak position of the second streak pixel candidate is within a predetermined range, the determination unit sets the streak position of the second streak pixel candidate as the streak pixel position.

Further features of the present invention will become apparent from the following description of exemplary embodiments with reference to the attached drawings.

BRIEF DESCRIPTION OF THE DRAWINGS

FIGS. 13A, 13B, and 13C each illustrate examples of a result of the streak detection by the first dust detection unit, a result of the streak detection by the second dust detection unit, and a result of the determination by the width comparison unit.

DESCRIPTION OF THE EMBODIMENTS

Figure 1:
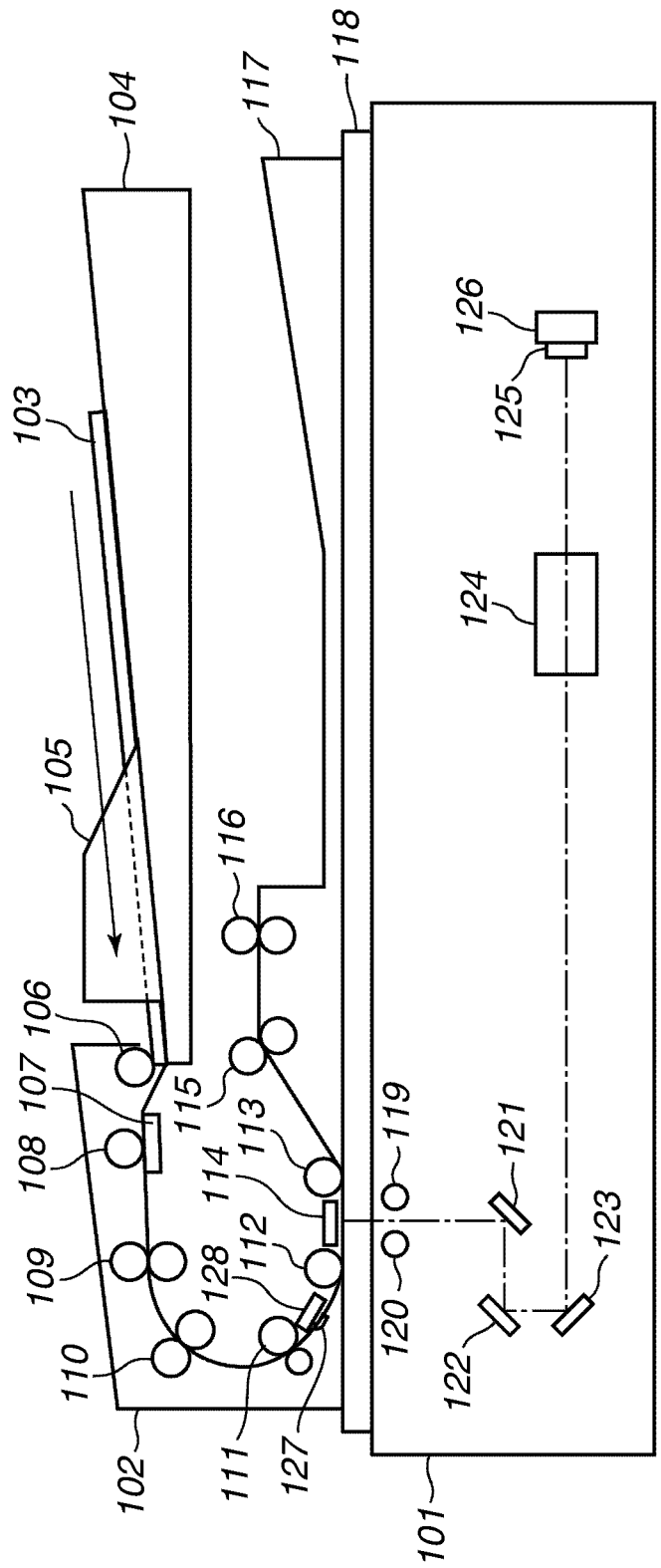
FIG. 1 is a cross-sectional view illustrating an image reading apparatus.

FIG. 1 is a cross-sectional view illustrating an image reading apparatus according to an exemplary embodiment of the present invention. The image reading apparatus includes an image reading device 101 and an automatic document feeder 102. The automatic document feeder 102 includes a document tray 104, a conveyance unit for conveying a document, and a sheet discharge tray 117. Documents 103 placed on the document tray 104 are conveyed to a separation unit by a pickup roller 106. Then, a separation pad 107 and a separation roller 108 separate the uppermost sheet of the document bundle from the document bundle one by one. At this time, a width regulating plate 105 is in abutment with the documents 103 placed on the document tray 104, whereby the documents 103 can be prevented from being conveyed in a skewed state. A skew of the separated document 103 is corrected by a first registration roller 109. Then, the document 103 is conveyed to a reading position by a second registration roller 110, a first conveyance roller 111, and a second conveyance roller 112.

A document detection flag 127 is disposed between the first conveyance roller 111 and the second conveyance roller 112. The timing at which reading of a document starts is controlled according to a detection result of the document detection flag 127. After passing through the reading position, the document 103 is conveyed by a third conveyance roller 113, a fourth conveyance roller 115, and a sheet discharge roller 116, and is discharged onto the sheet discharge tray 117.

When the document 103 passes through the reading position set between the second conveyance roller 112 and the third conveyance roller 113, the document 103 is illuminated by light sources 119 and 120. Then, light reflected from the document 103 is transmitted through a reading glass 118, is reflected by mirrors 121, 122, and 123, and is guided to an imaging lens 124. The guided light is converged by the imaging lens 124, and is imaged on a line sensor 125 including image sensors such as charge coupled device (CCD) sensors arranged in a line. The imaged light is converted into an electric signal by the line sensor 125, and is then converted into a digital signal by a signal processing board 126. A white guide plate 114 is attached at a position facing the document reading position, and the line sensor 125 outputs image data (an output value) acquired by reading the white guide plate 114 when no document exists on the reading position. In the present exemplary embodiment, a white member is embodied by the white guide plate 114, but may be embodied by a member that is not plate, such as a white roller.

Figure 2:
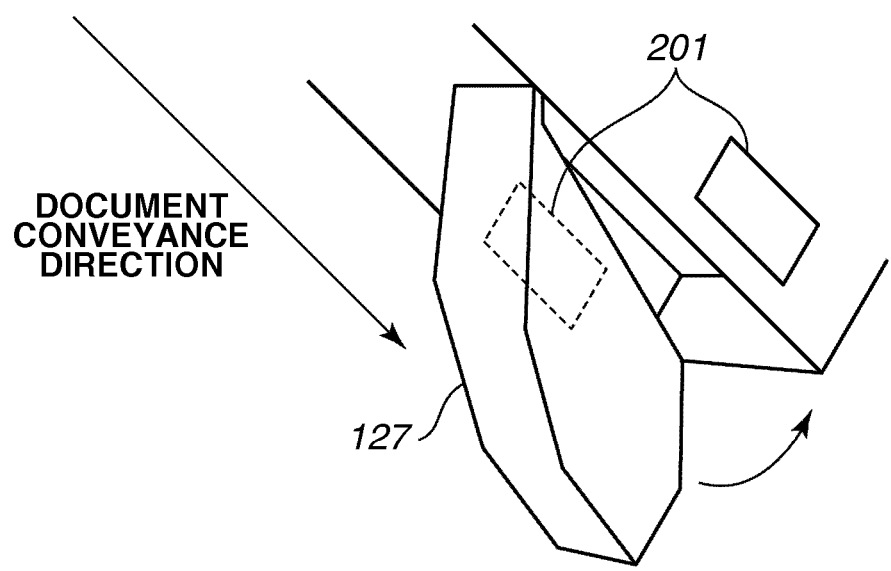
FIG. 2 illustrates the configurations of a document detection flag, a document detection unit, and a document detection sensor.

In the following description, the document detection flag 127 and a document detection sensor 201 will be described with reference to FIG. 2. When the document 103 is conveyed to the document detection flag 127, the leading edge of the document 103 contacts the document detection flag 127, whereby the document detection flag 127 tilts toward the document detection sensor 201, and intervenes between components of the document detection sensor 201. The document detection sensor 201 includes a light emitting unit and a light receiving unit. Therefore, the intervention of the document detection flag 127 therebetween causes a change in an electric signal from the document detection sensor 201. Detecting this change allows the arrival of the document 103 at the position of the document detection flag 127 to be detected.

Figure 3:
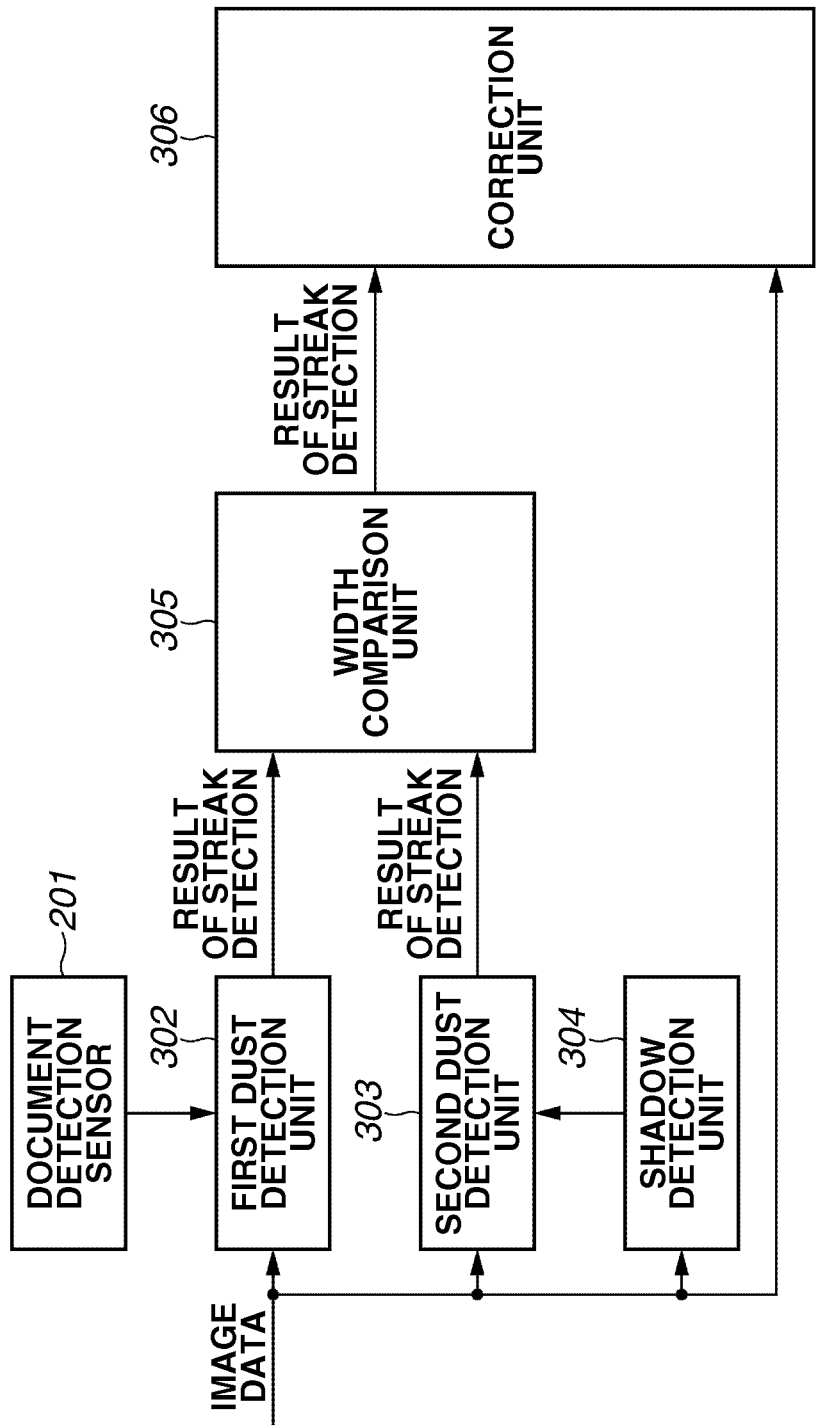
FIG. 3 is a block diagram illustrating image processing for performing a dust streak correction.

FIG. 3 is a block diagram illustrating image processing for performing a dust streak correction according to the present exemplary embodiment. Image data (an output value) output from the signal processing board 126 is input into the respective image processing units, namely, a first dust detection unit 302, a second dust detection unit 303, and a shadow detection unit 304. Each of the image processing units may be realized by an electric circuit, or may be realized by a module in which a not-illustrated central processing unit (CPU) performs processing.

The first dust detection unit 302 detects a streak pixel candidate from the image data output from the signal processing board 126, when no document passes through the reading position. In other words, the first dust detection unit 302 detects a streak pixel candidate from the image data of the white guide plate 114. The streak pixel candidate detected by the first dust detection unit 302 is considered to be attributed to dust attached on the white guide plate 114 or dust attached on the reading glass 118.

The shadow detection unit 304 detects the leading edge of the document 103 by detecting a shadow generated at the leading edge of the document 103 from the image data.

The second dust detection unit 303 detects a streak pixel candidate from the image data of the document 103 (the leading edge area of the document 103) immediately after the leading edge of the document 103 has passed through the reading position, based on the information about the leading edge of the document 103 output from the shadow detection unit 304. Information such as characters and figures is written on the central portion of the document 103, whereby it is difficult to detect a streak due to dust therefrom. The present exemplary embodiment detects a dust streak using the leading edge area of the document 103 where little document information is printed. The streak pixel candidate detected by the second dust detection unit 303 is considered to be attributed to dust attached on the reading glass 118.

A width comparison unit 305 determines a streak pixel position from a result of the detection of a streak pixel candidate by the first dust detection unit 302 and a result of the detection of a streak pixel candidate by the second dust detection unit 303.

A correction unit 306 performs a dust streak correction on the image data of the document 103 based on the streak pixel position determined by the width comparison unit 305.

Figure 4:
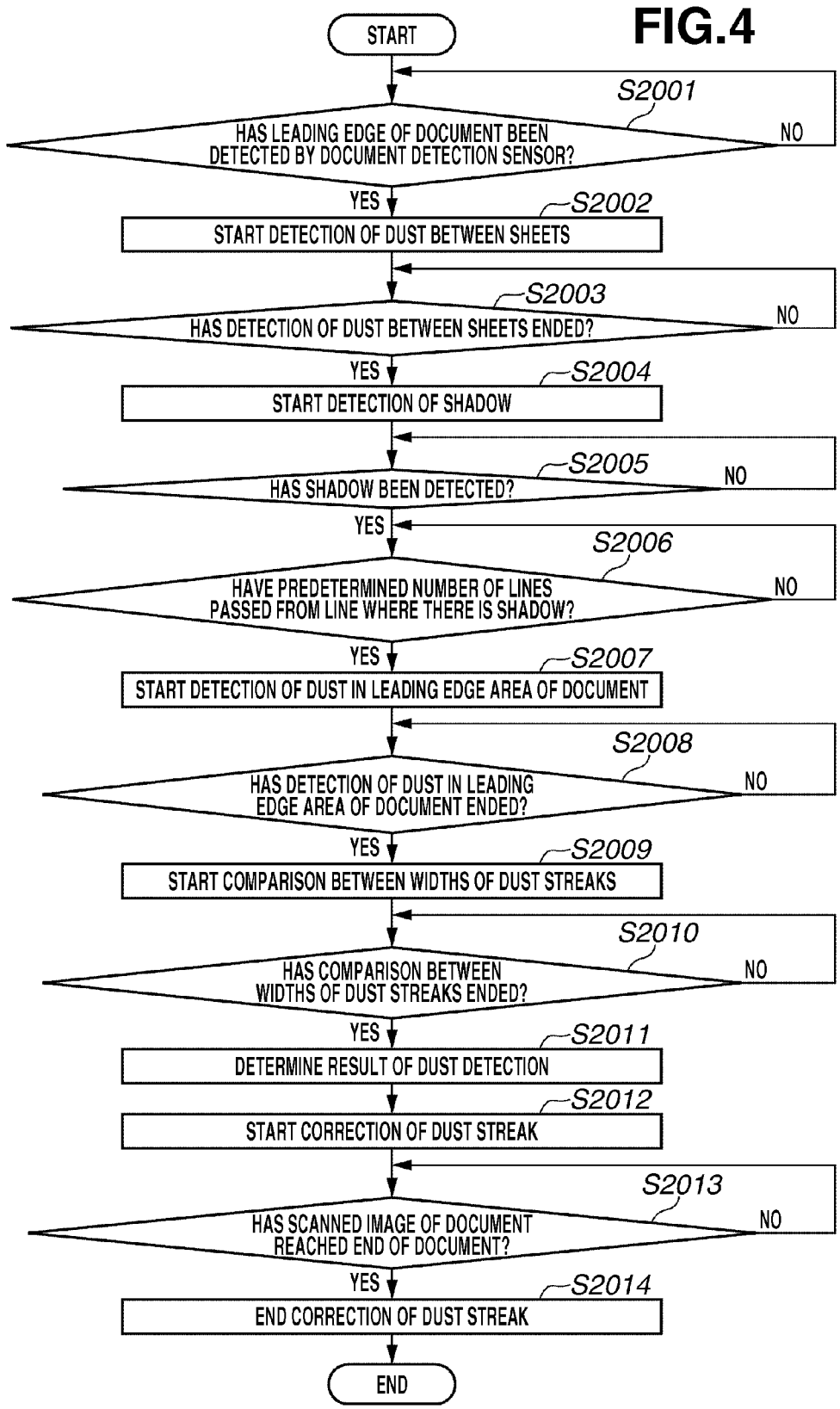
FIG. 4 is a flowchart illustrating a processing procedure of the image processing.

FIG. 4 is a flowchart illustrating a processing procedure of image processing.

In step S2001, the document detection sensor 201 detects whether the document 103 has reached the position of the document detection flag 127.

If the document detection sensor 201 has detected the arrival of the document 103 at the position of the document detection flag 127 (YES in step S2001), then in step S2002, the first dust detection unit 302 starts detecting a streak pixel candidate from the image data.

If the first dust detection unit 302 has ended the detection processing (YES in step S2003), then in step S2004, the shadow detection unit 304 starts the processing for detecting the leading edge of the document 103.

If the shadow detection unit 304 has detected a shadow generated at the leading edge of the document 103 from the image data (YES in step S2005), after a predetermined number of lines have passed from the line where the shadow had been detected (YES in step S2006), then in step S2007, the second dust detection unit 303 starts detecting a streak pixel candidate from the image data. The shadow detection unit 304 performs the shadow detection for each main scanning position, and, therefore, detects a shadow at a different timing for each main scanning position if the document 103 is in a skewed state. Therefore, in this case, the second dust detection unit 303 also starts the processing at a different timing for each main scanning position. The main scanning position means a position in a main scanning direction, which is a direction perpendicular to a conveyance direction in which the document 103 is conveyed.

After the second dust detection unit 303 has ended the dust detection (YES in step S2008), then in steps S2009, S2010, and S2011, the width comparison unit 305 determines a streak pixel position in the main scanning direction from the result of the detection of a streak pixel candidate by the first dust detection unit 302, and the result of the detection of a streak pixel candidate by the second dust detection unit 303.

In step S2012, the correction unit 306 performs a dust streak correction on the image data with use of the determined streak pixel position. In steps S2013 and S2014, after the scanned image of the document 103 has reached the end of the document 103, the correction unit 306 ends the dust streak correction.

The detection processing that is performed by the first dust detection unit 302 (step S2002) will be described.

The first dust detection unit 302 starts detection of dust between sheets according to the document detection sensor 201 having detected arrival of the document 103 at the position of the document detection flag 127. In the present exemplary embodiment, the document detection sensor 201 is disposed at a slightly upstream side of the reading position in the conveyance direction. There is no document at the reading position at the timing that the document detection sensor 201 detects the leading edge of the document 103. Therefore, the present exemplary embodiment starts the dust detection using the first dust detection unit 302 according to the document detection sensor 201 having detected the leading edge of the document 103.

Figure 6:
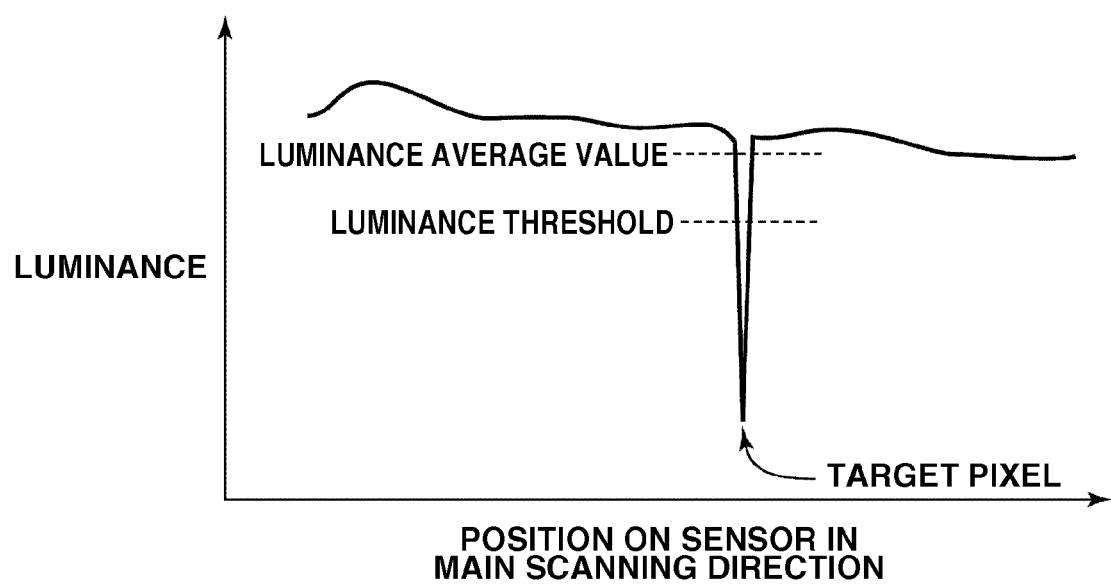
FIG. 6 is a diagram illustrating a luminance value of image data at a pixel position corresponding to a position of dust.

In a case where image reading is performed with no document existing at the document reading position, the line sensor 125 reads the white guide plate 114 illustrated in FIG. 1. Therefore, the image data output from the line sensor 125 has substantially evenly stabilized luminance values. However, in a case where there is dust on the white guide plate 114 or the reading glass 118, light emitted from the light sources 119 and 120 is blocked by the dust, whereby a reduced light amount is incident on the line sensor 125. Therefore, as illustrated in FIG. 6, the image data has a low luminance value at a pixel position corresponding to a position of dust (indicated as a target pixel in FIG. 6). As illustrated in FIG. 6, the present exemplary embodiment finds out a pixel having a low luminance value compared to surrounding pixels in the main scanning direction, and determines that this pixel is a dust pixel. The main scanning direction corresponds to a direction in which the pixels of the line sensor 125 are arranged, and is a direction perpendicular to the conveyance direction (a sub-scanning direction) at the reading position.

Figure 5:
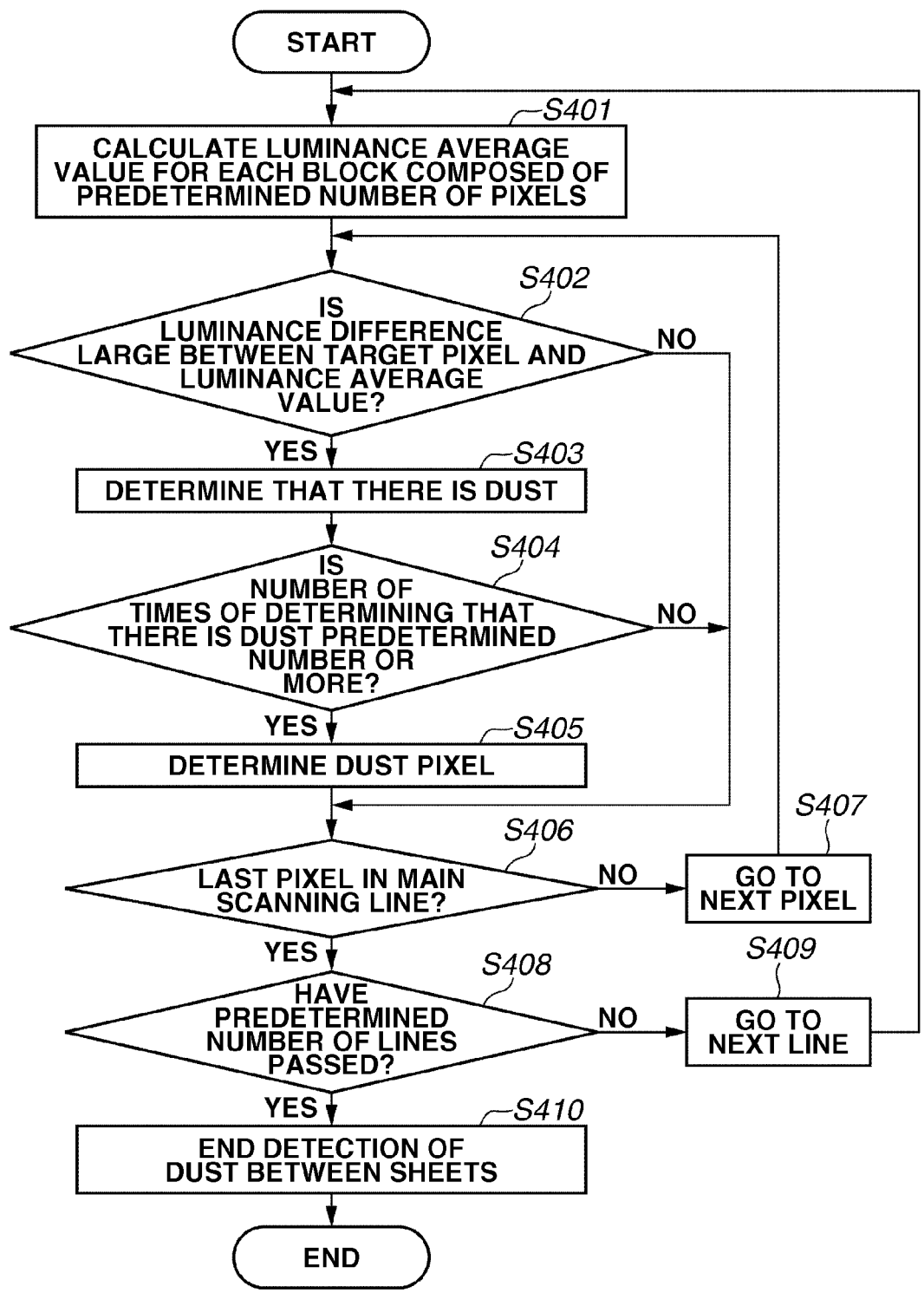
FIG. 5 is a flowchart illustrating a processing procedure of detection processing that is performed by a first dust detection unit.

FIG. 5 is a flowchart illustrating a processing procedure of the detection processing that is performed by the first dust detection unit 302 (S2002).

First, in step S401, the first dust detection unit 302 acquires image data of one main scanning line, and calculates the average value of luminance values for each block composed of a predetermined number of pixels. Then, in step S402, the first dust detection unit 302 calculates the difference between the luminance value of a target pixel and the luminance average value of the block containing the target pixel, and determines whether this difference is larger than a predetermined value. If the difference is larger than the predetermined value (YES in step S402), then in step S403, the first dust detection unit 302 determines that there is dust at the pixel position of the target pixel, and increments a determination counter corresponding to the pixel position of the target pixel. According to the present exemplary embodiment, the use of the average value of each block enables a highly accurate determination to be made even if, for example, there is local unevenness in luminance. It should be noted that the luminance average value tends to be low for a plurality of pixels including a pixel having a streak, which makes detection of the pixel having the streak difficult. Therefore, the first dust detection unit 302 may be configured so as to sort luminance values within a block in ascending order, and calculate the average value of luminance values of a predetermined number of pixels having high luminance values. Due to this configuration, the first dust detection unit 302 can make a further highly accurate determination.

Next, in step S404, the first dust detection unit 302 determines whether the count number of the determination counter corresponding to the pixel position of the target pixel is a predetermined number of times or more. Then, if the count number is the predetermined number of times or more (YES in step S404), then in step S405, the first dust detection unit 302 determines that the pixel position of this target pixel is a dust pixel candidate (a streak pixel candidate). Then, the first dust detection unit 302 stores a flag indicating that this pixel position is a dust pixel (a streak pixel candidate) while associating this flag with the pixel position.

In steps S406 and S407, the first dust detection unit 302 repeats the processes of steps S402 to S405 until the first dust detection unit 302 has processed the last pixel in the one main scanning line. Further, in steps S408 and S409, the first dust detection unit 302 repeats the processes of steps S401 to S407 until the first dust detection unit 302 has processed a predetermined number of main scanning lines. If the predetermined number of lines have passed from the start of the dust detection by the first dust detection unit 302 (YES in step S408), then in step S410, the first dust detection unit 302 ends this dust detection. By repeating the processes of steps S401 to S409 for the image data of a plurality of different main scanning lines in this way, it is possible to prevent a dust pixel from being determined from a noise, and determine a dust pixel highly accurately.

The processing for detecting the leading edge of the document 103 (step S2004), which is performed by the shadow detection unit 304, will be described.

Figure 7:
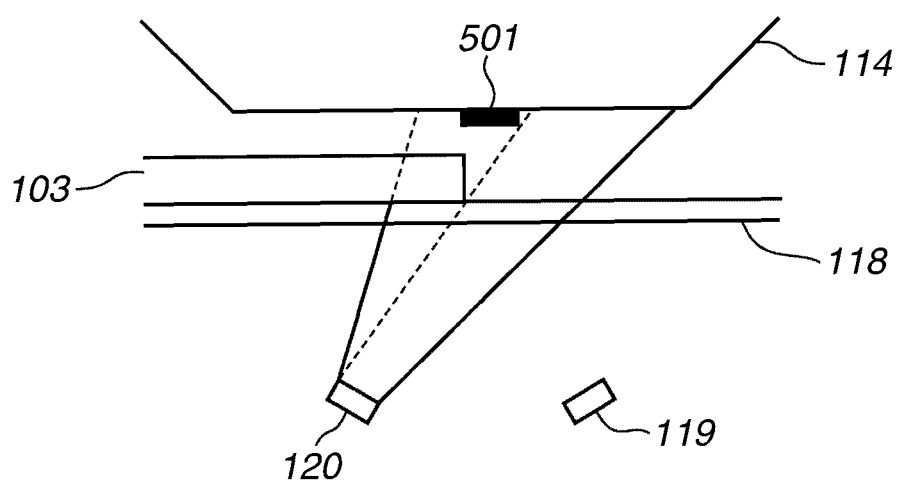
FIG. 7 is a cross-sectional view illustrating a reading position and the vicinity thereof when a leading edge of a document being conveyed has arrived the reading position.

FIG. 7 is a cross-sectional view illustrating the reading position and the vicinity thereof when the leading edge of the document 103 being conveyed has arrived the reading position. When the leading edge of the document 103 passes through the image reading position, the document 103 blocks light emitted from the light source 120 located at the upstream side in the document conveyance direction. Therefore, a shadow 501 is generated on the white guide plate 114 located apart from a surface of the document 103 to be read due to the blocking of the light of the light source 120 by the document 103. As a result, the light incident on the line sensor 125 also decreases, thereby reducing a luminance value when the shadow 501 is read. The shadow detection unit 304 can detect the leading edge of the document 103 by detecting the shadow 501 based on the luminance value.

The shadow detection unit 304 stores a luminance value when no shadow exists as an initial luminance value (a reference value), and detects that the luminance value of the image data from the line sensor 125 falls below this initial luminance value (the reference value). From this detection, the shadow detection unit 304 can determine when the leading edge of the document 103 has arrived the image reading position.

In a case where the document 103 is conveyed in a skewed state, a shadow is generated at the left end and the right end of the document 103 at different timings. Therefore, in the present exemplary embodiment, the shadow detection unit 304 detects the position of the leading edge of the document 103 for each main scanning position.

Figure 8:
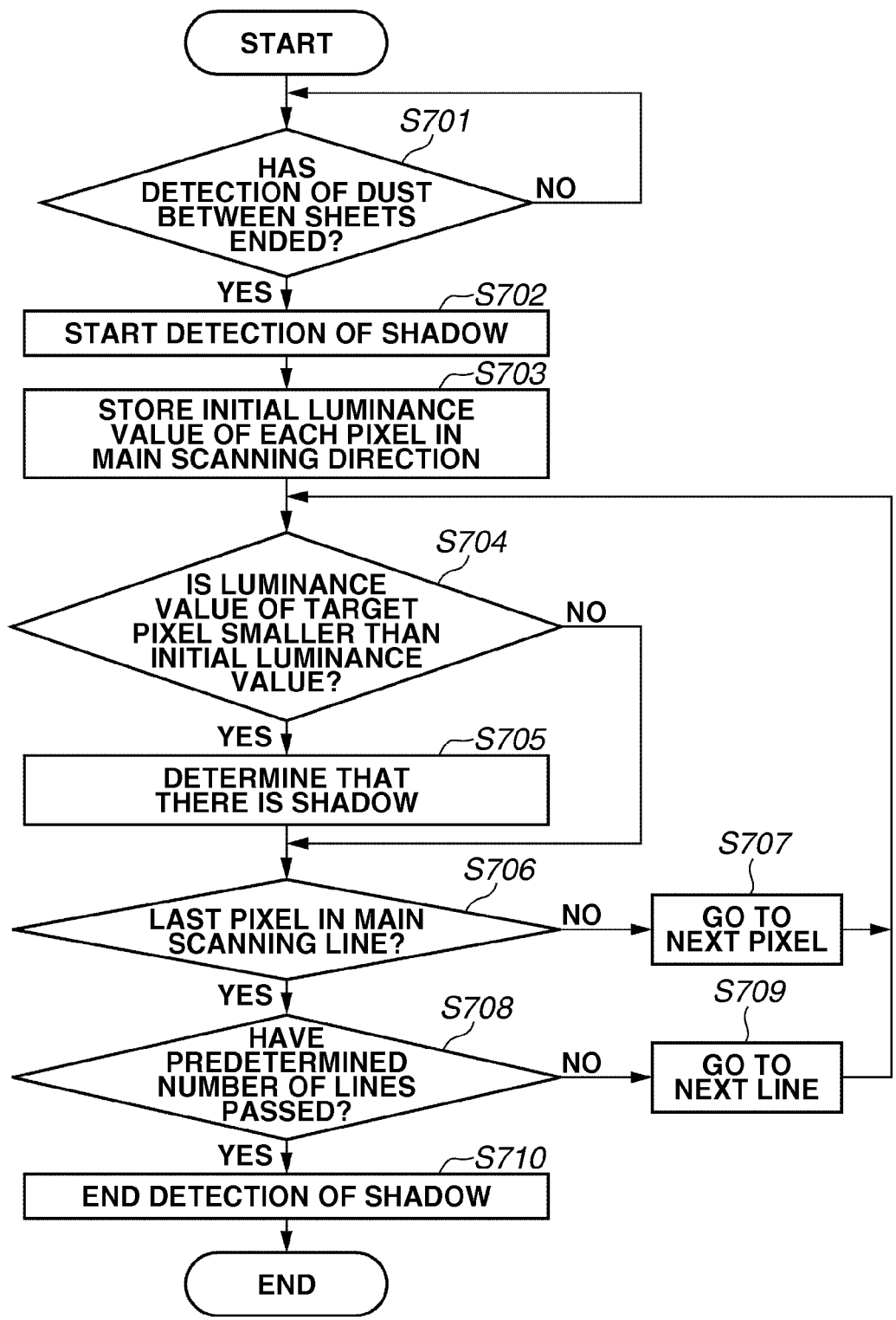
FIG. 8 is a flowchart illustrating a processing procedure of processing for detecting the leading edge of the document, which is performed by a shadow detection unit.

FIG. 8 is a flowchart illustrating a processing procedure of the processing for detecting the leading edge of the document 103 (S2004), which is performed by the shadow detection unit 304.

In steps S701 and S702, the shadow detection unit 304 starts the processing after the end of the processing by the first detection unit 302. First, in step S703, the shadow detection unit 304 stores the luminance value of each pixel in the main scanning direction at the time of the start of the shadow detection as an initial luminance value while associating it with the pixel position of each pixel in the main scanning direction, to store the luminance value when the document 103 does not pass through the reading position. In the present exemplary embodiment, the image reading apparatus is designed in such a manner that the leading edge of the document 103 does not reach the reading position yet at the time of an end of the processing by the first dust detection unit 302. Therefore, the luminance value when the shadow detection unit 304 starts the shadow detection indicates a read value of the white guide plate 114 with no shadow generated.

The shadow detection unit 304 performs the following processes after reading a next main scanning line. In step S704, the shadow detection unit 304 compares the luminance value of a target pixel with the initial luminance value stored so as to correspond to the main scanning position of the target pixel. If the luminance value of the target pixel is lower than the initial luminance value by a predetermined value or more (YES in step S704), then in step S705, the shadow detection unit 304 determines that there is a shadow at this main scanning position. In other words, the shadow detection unit 304 uses a value lower than the initial luminance value by the predetermined value as a reference for shadow detection.

Further, in a case where the document 103 is conveyed in a skewed state, a shadow is generated at the left end and the right end of the document 103 at different timings. Therefore, the shadow detection unit 304 detects a position where there is a shadow for each main scanning position. In steps S706 and S707, the shadow detection unit 304 performs the processes of steps S704 and S705 from the first pixel to the last pixel in the main scanning direction sequentially. Then, in steps S708 and S709, the shadow detection unit 304 performs the processes of steps S704 to S707 until the number of processed lines has reached the predetermined number of lines. When the number of processed lines has reached the predetermined number of lines (YES in step S708), then in step S710, the shadow detection unit 304 ends the shadow detection.

The second dust detection unit 303 performs the dust detection (S2007) using the image data of the leading edge area of the document 103, and this processing will be described.

It is desirable that the second dust detection unit 303 performs the dust detection by using the image data immediately after the leading edge of the document 103 has passed. This is because information such as characters and figures is written on the document 103, and makes detection of a streak due to dust difficult. Therefore, it is desirable that the second dust detection unit 303 detects dust by using a margin area on which little information of the document 103 is printed.

It is desirable that the second dust detection unit 303 performs the dust detection in the leading edge area of the document 103 where nothing is printed on the document 103 if possible, whereby the second dust detection unit 303 uses the result of the shadow detection unit 304. The shadow detection unit 304 can detect the shadow 501 generated by the leading edge of the document 103, and, therefore, can determine the timing at which the leading edge of the document 103 being conveyed passes through the reading position.

In a case where the document 103 is conveyed in a skewed state, this conveyance may lead to such a situation that, for example, the leading edge of the document 103 has reached the document reading position at the left end of the document 103 but has not reached the document reading position yet at the right end of the document 103. In this case, if the second dust detection unit 303 starts detecting dust in the leading edge area of the document 103 for all pixels in the main scanning direction simultaneously, this means that the second dust detection unit 303 performs the dust detection on the image data when no document exists at the right end of the document 103 where the leading edge of the document 103 has not reached the reading position yet. In other words, the second dust detection unit 303 cannot perform the dust detection using the image data immediately after the leading edge of the document 103 has passed.

The shadow detection unit 304 detects the position of the leading edge of the document 103 for each position in the main scanning direction. Therefore, according to the present exemplary embodiment, the second dust detection unit 303 can perform the detection of dust in the leading edge area of the document 103 for each main scanning position at a different timing. The second dust detection unit 303 starts the dust detection of the second dust detection unit 303 from the image data output from the line sensor 125 after the document 103 is conveyed for a predetermine time from the detection of the shadow 501 by the shadow detection unit 304, and, therefore, can start the dust detection of the second dust detection unit 303 while shifting the timing for each main scanning position. As a result, the second dust detection unit 303 can reliably perform the dust detection in the leading edge area of the document 103 for each main scanning position.

Figure 9:
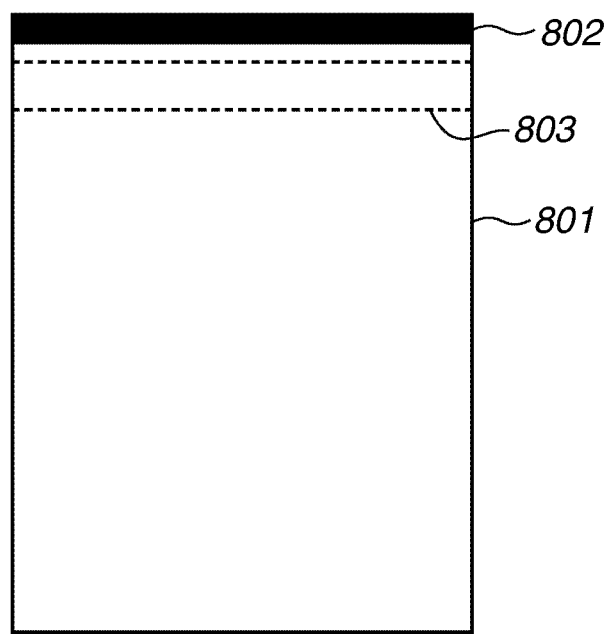
FIG. 9 is a schematic view illustrating image read data when the document is conveyed in a skewed state.

FIG. 9 is a schematic view illustrating image read data when the document 103 is conveyed in a skewed state. There is shadow read image data 802 before the leading edge of document read image data 801. The shadow detection unit 304 detects this shadow read image data 802. In a case where the second dust detection unit 303 starts the detection of dust in the leading edge area of the document 103 after the document 103 is conveyed for the predetermined time from the detection of the shadow 501, an area 803 is an area where the second dust detection unit 303 performs the detection of dust in the leading edge area of the document 103. In this manner, according to the present exemplary embodiment, the second dust detection unit 303 can reliably perform the dust detection in the leading edge area of the document 103 at each main scanning position.

Figure 10:
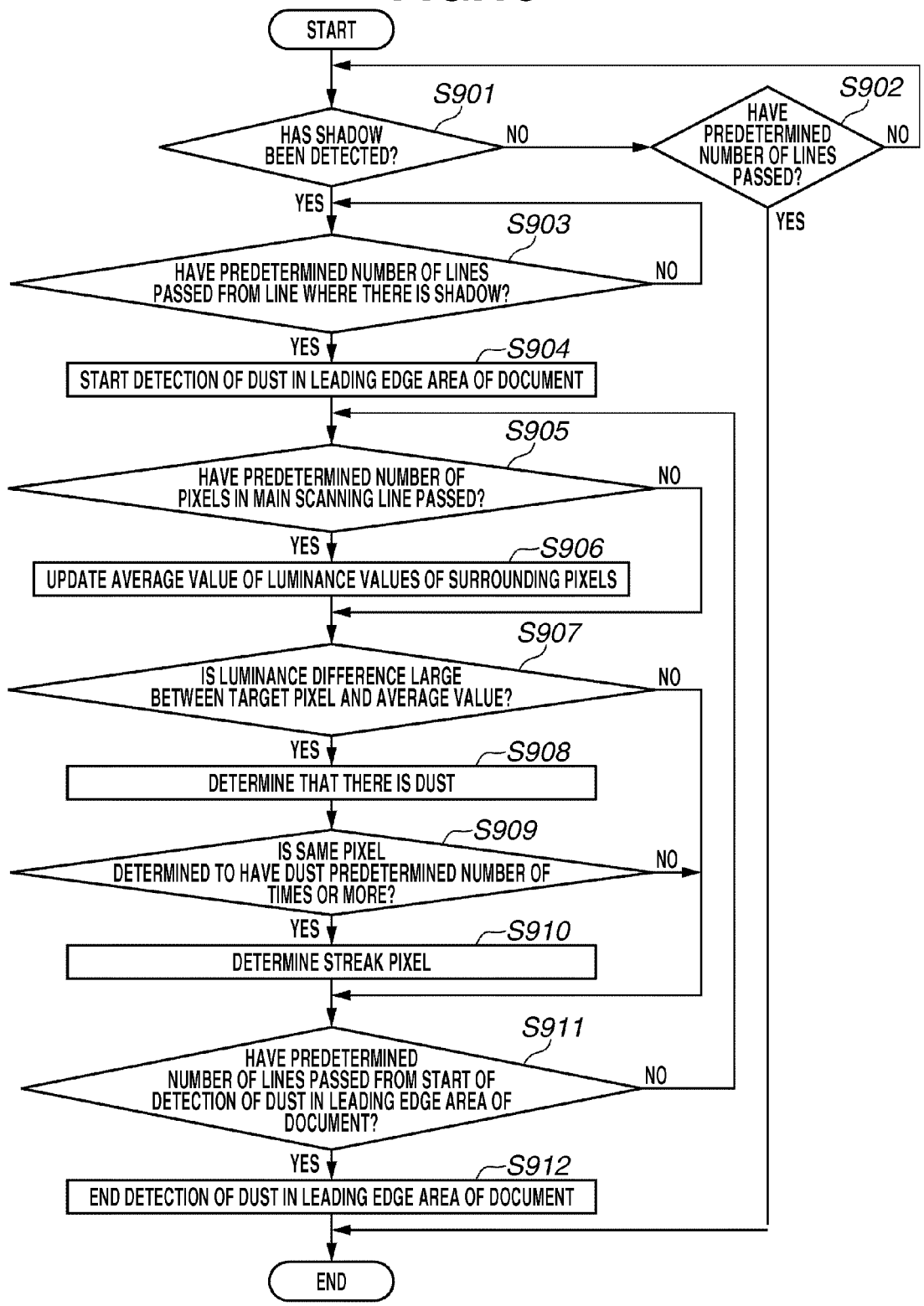
FIG. 10 is a flowchart illustrating a processing procedure of dust detection using image data of a leading edge portion of the document, which is performed by a second dust detection unit.

FIG. 10 is a flowchart illustrating a processing procedure of the dust detection that the second dust detection unit 303 performs using the image data of the document area (S2007). The second dust detection unit 303 performs the processing illustrated in FIG. 10 for each main scanning position to determine whether there is a streak pixel at each main scanning position.

First, in step S901, the second dust detection unit 303 receives a notification indicating that the shadow 501 has been detected from the shadow detection unit 304 (YES in step S901). In step 903, the second dust detection unit 303 waits at the main scanning position where this shadow was detected (a target pixel position) until the predetermined number of main scanning lines have passed from the main scanning line about which the notification was received. After the predetermined number of main scanning lines have passed from the main scanning line about which the notification was received (YES in step S903), the second dust detection unit 303 starts the dust detection on the image data output from the line sensor 125.

In step S902, the second dust detection unit 303 does not perform the detection of dust in the leading edge area of the document 103 for a main scanning position where no shadow is detected even after the predetermined number of lines have passed. In the present exemplary embodiment, the second dust detection unit 303 determines that there is no document at this main scanning position.

The second dust detection unit 303 determines a streak pixel according to the same idea as the idea employed when the first dust detection unit 302 determines a dust pixel.

When an image is read in the leading edge area of the document 103, the line sensor 125 reads a margin area of the document 103. Therefore, the line sensor 125 outputs the image data having substantially evenly stabilized luminance values. However, if there is dust on the reading glass 118, the dust blocks the light emitted from the light sources 119 and 120, thereby reducing a light amount incident on the line sensor 125. Therefore, the luminance value of the image data decreases at the pixel position corresponding to the position of the dust (a target pixel). The present exemplary embodiment finds out a pixel having a low luminance value compared to surrounding pixels in the main scanning direction, and determines that this pixel is a dust pixel.

After the predetermined number of main scanning lines have passed from the detection of the shadow 501 at the target pixel position, in step S905, the second dust detection unit 303 acquires the image data of pixels surrounding the target pixel position in the main scanning line. Then, in step S906, the second dust detection unit 303 calculates the average value of the luminance values of the target pixel and a predetermined number of surrounding pixels. Then, in step S907, the second dust detection unit 303 calculates the difference between the luminance value of the target pixel in the present main scanning line and the luminance average value of the block containing the target pixel, and determines whether this difference is larger than a predetermined value. If the difference is larger than the predetermined value (Yes in step S907), then in step S908, the second dust detection unit 303 determines that there is dust at the pixel position of the target pixel, and increments a determination counter corresponding to the pixel position of the target pixel. According to the present exemplary embodiment, the use of the average value of pixels surrounding the target pixel position allows the second dust detection unit 303 to make a highly accurate determination even if, for example, there is local unevenness in luminance.

It should be noted that the luminance average value tends to be low for a plurality of pixels including a pixel having dust, which makes detection of the pixel having a streak difficult. Therefore, the second dust detection unit 303 may be configured so as to sort luminance values within a block in ascending order, and calculate the average value of luminance values of a predetermined number of pixels having high luminance values. Due to this configuration, the second dust detection unit 303 can make a further highly accurate determination.

In step S909, the second dust detection unit 303 determines whether the count number of the determination counter corresponding to the pixel position of the target pixel is a predetermined number of times or more. Then, if the count number is the predetermined number of times or more (YES in step S909), then in step S910, the second dust detection unit 303 determines that the pixel position of this target pixel is a streak pixel candidate, and stores a flag indicating that this pixel position is a streak pixel candidate while associating this flag with the pixel position.

In step S911, the second dust detection unit 303 repeats the processes of steps S905 to S910 for a predetermined number of main scanning lines. After the predetermined number of lines have passed from the start of the detection of dust in the leading edge area of the document 103 (YES in step S911), then in step S912, the second dust detection unit 303 ends the detection of dust in the leading edge area of the document 103 for a target pixel position. By repeating the processes of steps S905 to S911 for the image data of a plurality of different main scanning lines in this way, it is possible to prevent a streak pixel candidate from being determined from a noise, and determine a dust pixel highly accurately.

Next, the processing of the width comparison unit 305 (S2009) will be described.

The width comparison unit 305 compares the streak pixel candidate determined by the first dust detection unit 302 and the streak pixel candidate determined by the second dust detection unit 303, and determines a streak pixel position in the document 103.

Figure 11:
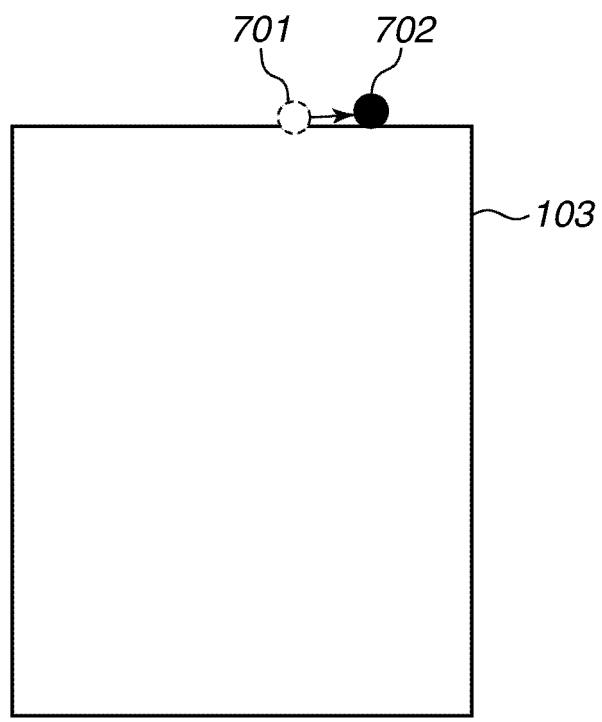
FIG. 11 illustrates an example in which the position of dust is horizontally displaced.

FIG. 11 illustrates an example in which the position of dust is horizontally displaced due to contact of the leading edge of the document 103. A position 701 indicates the position of dust before the leading edge of the document 103 contacts the dust. A position 702 indicates the position of the dust after the dust is displaced by contact of the leading edge of the document 103. Dust composed of a small particle such as paper dust may be displaced on the reading position due to, for example, contact of a document. In such a case, a result of the streak detection by the first dust detection unit 302 and a result of the streak detection by the second dust detection unit 303 do not match each other. Therefore, the present exemplary embodiment determines that a streak pixel candidate is a streak pixel position as long as the following conditions are satisfied, even if there is a difference between the main scanning position of a streak pixel candidate determined by the first dust detection unit 302 and the main scanning position of a streak pixel candidate determined by the second dust detection unit 303. The difference between the main scanning position of the streak pixel candidate determined by the first dust detection unit 302 and the main scanning position of the streak pixel candidate determined by the second dust detection unit 303 is within a predetermined range. In addition, the difference between the width of the streak pixel candidate determined by the first dust detection unit 302 and the width of the streak pixel candidate determined by the second dust detection unit 303 is within a predetermined range.

FIGS. 12A, 12B, and 12C, and FIGS. 13A, 13B, and 13C each illustrate examples of a result of the streak detection by the first dust detection unit 302, a result of the streak detection by the second dust detection unit 303, and a result of the determination by the width comparison unit 305.

In the respective figures, the top rows (801, 901, 1001, 1101, 1201, and 1301) indicate streak pixel candidates determined by the first dust detection unit 302. The middle rows (802, 902, 1002, 1102, 1202, and 1302) indicate streak pixel candidates determined by the second dust detection unit 303, and the bottom rows (803, 903, 1003, 1103, 1203, and 1303) indicate streak pixel positions determined by the width comparison unit 305.

Figure 12A:
FIGS. 12A, 12B, and 12C each illustrate examples of a result of the streak detection by the first dust detection unit, a result of the streak detection by the second dust detection unit, and a result of a determination by a width comparison unit.
Figure 12B:
Figure 12C:

The horizontal axis represents main scanning positions. Positions with "1" written thereon each indicate a main scanning position determined to be a streak pixel, and main scanning positions with "0" written thereon each indicate a main scanning position determined not to be a streak pixel. If the positional difference between a streak pixel candidate determined by the second dust detection unit 303 and a streak pixel candidate determined by the first dust detection unit 302 is within a predetermined range, and the width difference therebetween is within a predetermined range, the width comparison unit 305 determines that the streak pixel position of the streak pixel candidate determined by the second dust detection unit 303 is a streak pixel position. FIGS. 12A, 12B, and 12C illustrate examples in which the width comparison unit 305 determines that the main scanning positions of streak pixel candidates determined by the second dust detection unit 303 are streak pixel positions. FIGS. 13A, 13B, and 13C illustrate examples in which the width comparison unit 305 determines that the main scanning positions of streak pixel candidates determined by the second dust detection unit 303 are not streak pixel positions.

Figure 14:
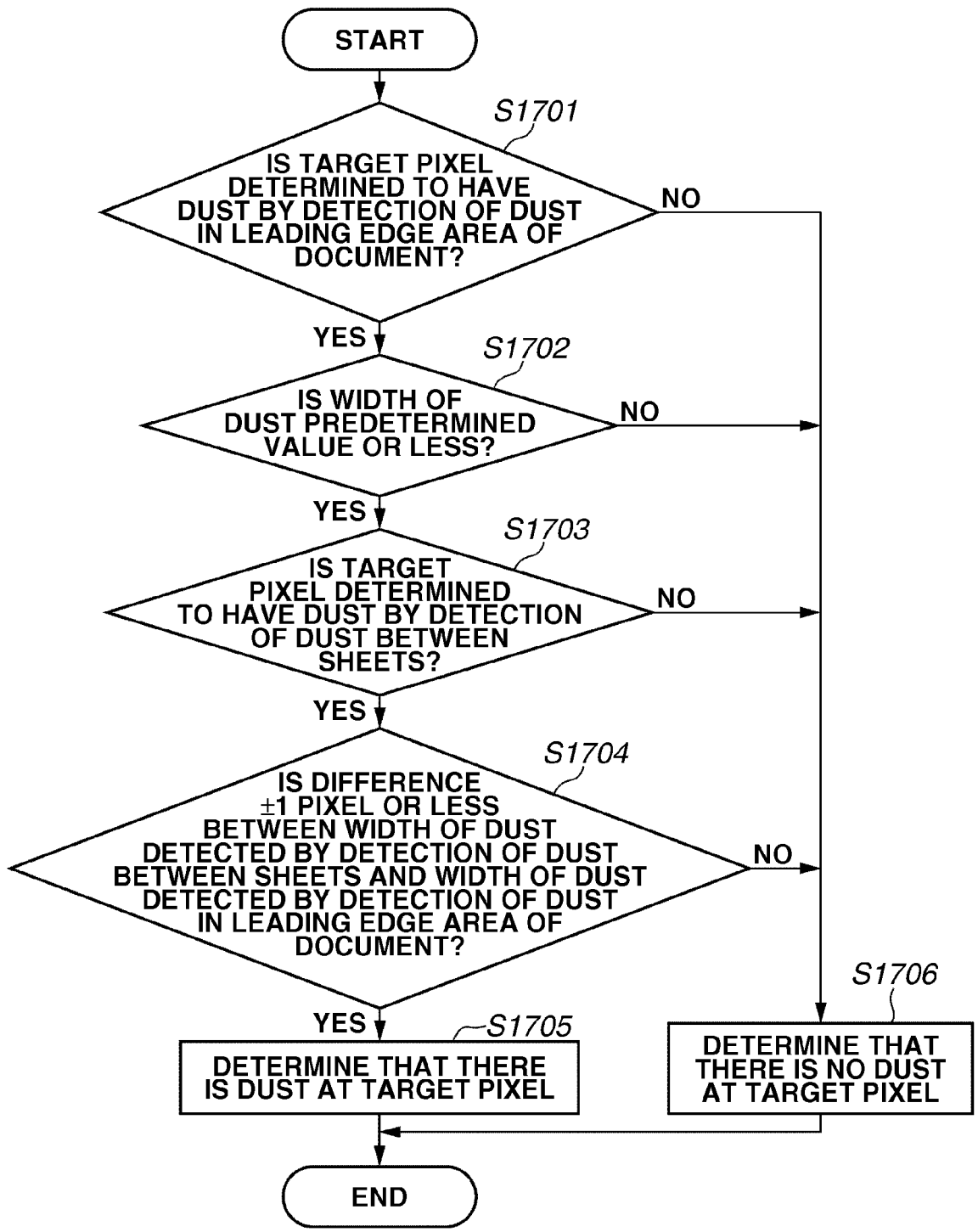
FIG. 14 is a flowchart illustrating a processing procedure by the width comparison unit.

FIG. 14 is a flowchart illustrating a processing procedure of the width comparison unit 305 (S2009). The width comparison unit 305 performs the processing illustrated in FIG. 14 for each main scanning position to determine whether there is a streak pixel at each main scanning position.

In step S1701, the width comparison unit 305 refers to the detection result by the second dust detection unit 303 corresponding to the target pixel position to determine whether the target pixel position is a streak pixel. If the detection result by the second dust detection unit 303 corresponding to the target pixel position indicates that the target pixel position is not a streak pixel (NO in step S1701), then in step S1706, the width comparison unit 305 determines that the target pixel position is not a streak pixel, i.e., there is no dust at the target pixel position.

On the other hand, if the detection result by the second dust detection unit 303 corresponding to the target pixel position indicates that the target pixel position is a streak pixel candidate (YES in step S1701), then in step S1702, the width comparison unit 305 calculates the width of the streak to determine whether the width of the streak is a predetermined value or less. More specifically, the width comparison unit 305 refers to the detection result by the second dust detection unit 303 to calculate how many consecutive detection results indicate streak pixel candidates in the main scanning direction. Then, the width comparison unit 305 determines whether this number of consecutiveness is a predetermined value or less.

The width comparison unit 305 determines that there is no dust if the width is the predetermined value or more, because dust that may be generated from feeding-reading is attributed to an extremely small particle such as paper dust, and a streak generated by such dust should be thin. Then, if a streak pixel candidate is wider than the predetermined value, this streak pixel candidate may be a ruled line or the like printed on the document 103. Therefore, in the present exemplary embodiment, the width comparison unit 305 determines that such a candidate is not a streak pixel.

If the width of the streak is the predetermined value or less (YES in step S1702), then in step S1703, the width comparison unit 305 refers to the detection result by the first dust detection unit 302 to determine whether there is a streak pixel candidate determined by the first dust detection unit 302 at the target pixel position or within a predetermined range of main scanning positions from the target pixel position. In the present exemplary embodiment, the predetermined range of main scanning positions is set to ±one pixel or less. In other words, the width comparison unit 305 determines that the target pixel position is a streak pixel position if the main scanning position of the streak pixel candidate determined by the second dust detection unit 303 is shifted from the main scanning position of the streak pixel candidate determined by the first dust detection unit 302 by one pixel. On the other hand, the width comparison unit 305 determines that the target pixel position is not a streak pixel position if the main scanning position of the streak pixel candidate determined by the second dust detection unit 303 is shifted from the main scanning position of the streak pixel candidate determined by the first dust detection unit 302 by two pixels or more. If the width comparison unit 305 determines YES in step S1703 (YES in step S1703), then in step S1704, the width comparison unit 305 compares the width of the streak pixel candidate determined by the second dust detection unit 303 with the width of the streak pixel candidate determined by the first dust detection unit 302. Then, if the width difference is ±one pixel or less (YES in step S1704), then in step S1705, the width comparison unit 305 determines that the target pixel position is a streak pixel position. For example, in a case where the streak detected as a result of the detection by the first dust detection unit 302 is three pixels in width and the streak detected as a result of the detection by the second dust detection unit 303 is four pixels in width, the difference between them is one pixel. Therefore, in this case, the width comparison unit 305 determines that the width difference is one pixel or less. In a case where the streak detected as a result of the detection by the first dust detection unit 302 is three pixels in width and the streak detected as a result of the detection by the second dust detection unit 303 is five pixels in width, the difference between them is two pixels. In this case, the width comparison unit 305 determines that the width difference is not ±one pixel or less. The width comparison unit 305 determines that there is dust if the width difference is ±one pixel or less, because the position of the dust may be displaced in the main scanning direction when the dust contacts, for example, the leading edge of the document 103.

On the other hand, if the width comparison unit 305 determines NO in any of the processes of steps S1701 to S1704 (NO in step S1701, S1702, S1703, or S1704), the width comparison unit 305 determines that the target pixel position is not a streak pixel position. The target pixel position indicates a position in the main scanning direction.

In the present exemplary embodiment, the width comparison unit 305 determines that there is dust if the width difference is ±one pixel or less, and determines that there is no dust if the widths are different by more than that. However, this limit of the width difference may be further extended, and ±two pixels or a larger value may be set as the upper limit of the width difference. However, setting a large value may generate a problem, because this increases the possibility of determining that a ruled line in the leading edge area of the document 103 is dust in a case where there is dust at the same main scanning position as the printed ruled line existing in the leading edge area of the document 103. Therefore, the processing by the width comparison unit 305 may additionally include a process of comparing the luminance value of the dust detected by the detection of dust between sheets with the luminance value of the dust detected by the detection of dust in the leading edge area of the document 103, and determining that there is dust if the luminance values are substantially equal. A streak that may be generated during feeding-reading is attributed to an extremely small particle such as paper dust. Therefore, even if there is such dust, the luminance value less likely decreases significantly. On the other hand, in most cases, a ruled line or the like in a printed product has a dark density to emphasize a contrast relative to the background of the document to improve the visibility, and highly likely exhibits a low luminance value compared to a streak. Therefore, a comparison between luminance values can reduce the possibility of a false determination. Alternatively, simply, the width comparison unit 305 may determine that there is no dust if the dust detected in the leading edge area of the document 103 has a luminance value of a predetermined value or lower.

In each of the examples illustrated in FIGS. 12A, 12B, and 12C, although the result of the detection of a streak pixel candidate by the first dust detection unit 302 is different from the result of the detection of a streak pixel candidate by the second dust detection unit 303, the width comparison unit 305 determines that the pixel position(s) of the streak pixel candidate(s) detected by the second dust detection unit 303 in the main scanning direction are streak pixel position(s) in the document 103. In other words, the width comparison unit 305 determines that the dust is displaced.

On the other hand, in each of the examples illustrated in FIGS. 13A, 13B, and 13C, the width comparison unit 305 determines that the pixel position(s) of the streak pixel candidate(s) detected by the second dust detection unit 303 in the main scanning direction are not streak pixel position(s) in the document 103. The detection result by the second dust detection unit 303 is ignored in this manner to deal with such an example that the detected area at the leading edge of the document 103 is not a margin area. Even in the leading edge area of the document 103, if a character, a stain, or the like is printed on the document 103, they may be incorrectly determined as a streak. Therefore, the width comparison unit 305 compares the positions where there are streaks between the detection of dust in the leading edge area of the document 103 and the detection of dust between sheets. If the width comparison unit 305 determines that the difference between them is not a displacement of dust, the width comparison unit 305 determines that the result of the detection of dust in the leading edge area of the document 103 is incorrect, and changes the result of the detection of dust in the leading edge area of the document 103 to "0".

As described above, the present exemplary embodiment has been described based on the example that determines that a streak pixel candidate is a pixel with a streak generated thereon if the width of the streak detected in the leading edge area of the document 103 is different only by one pixel from the width of the streak detected between sheets, and determines that a streak pixel candidate is a pixel without a streak generated thereon if these widths are different from each other by two pixels or more. However, the present exemplary embodiment may determine that a streak pixel candidate is a pixel with a streak generated thereon even if the widths of the streaks are different from each other by two pixels or more, in a case where the dust attached on the reading position is displaced by one pixel or more when being displaced by contacting the document 103 during conveyance of the document 103.

The processing of the correction unit 306 will be described.

The correction unit 306 performs a dust streak correction on the image data based on the streak detection result output from the width comparison unit 305.

Figure 15:
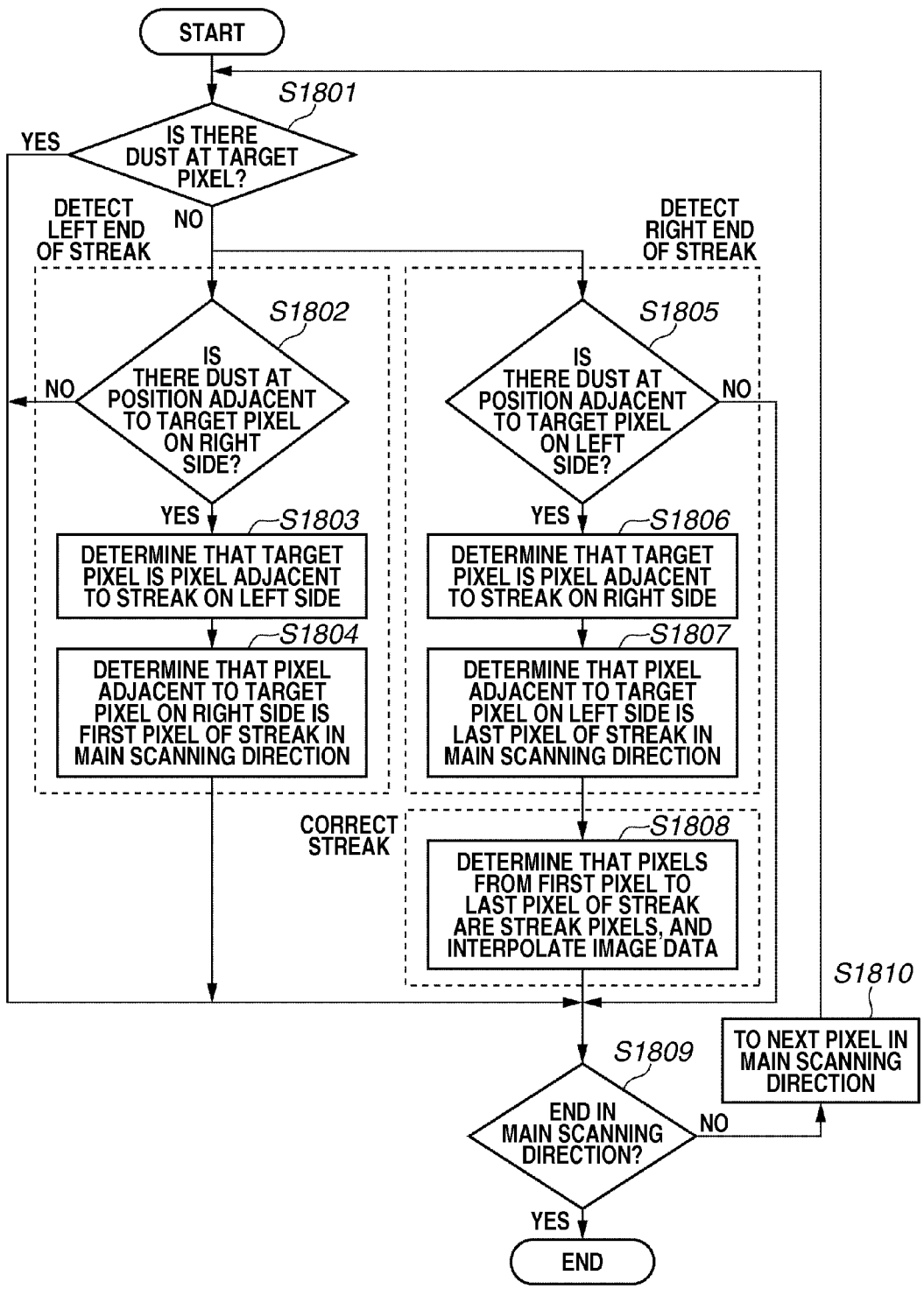
FIG. 15 is a flowchart illustrating a processing procedure by a correction unit.

FIG. 15 is a flowchart illustrating a processing procedure of the correction unit 306 (S2012).

First, a process for detecting a left end will be described. In step S1801, the correction unit 306 determines whether the target pixel position is not a streak pixel (whether there is no dust) by referring to the streak detection result output from the width comparison unit 305. If the target pixel position is not a streak pixel (NO in step S1801), the correction unit 306 performs a process for detecting the left end of a streak and a process for detecting the right end of a streak, because pixel positions adjacent to the target pixel position on the right side and the left side may be the left end of a streak and the right end of a streak. Steps S1802 to S1804 in the flowchart correspond to the process for detecting the left end of a streak in the main scanning direction. Steps 1805 to 1807 in the flowchart correspond to the process for detecting the right end of a streak in the main scanning direction.

If the correction unit 306 determines that the target pixel position is not a streak pixel (NO in step S1801), then in step S1802, the correction unit 306 refers to the streak detection result output from the width comparison unit 305 to determine whether there is dust adjacent to the target pixel position on the right side. If the correction unit 306 determines that there is dust adjacent to the target pixel position on the right side (YES in step S1802), then in step S1803, the correction unit 306 determines that the target pixel position is a pixel adjacent to a streak on the left side. Then, in step S1804, the correction unit 306 determines that the pixel adjacent to the target pixel position on the right side is the first pixel of the streak in the main scanning direction. If the correction unit 306 determines NO in step S1802 (NO in step S1802), the processing proceeds to step S1809.

Further, if the correction unit 306 determines that the target pixel position is not a streak pixel (NO in step S1801), then in step S1805, the correction unit 306 refers to the streak detection result output from the width comparison unit 305 to determine whether there is dust adjacent to the target pixel position on the left side. If the correction unit 306 determines that there is dust adjacent to the target pixel position on the left side (YES in step S1805), then in step S1806, the correction unit 306 determines that the target pixel position is a pixel adjacent to a streak on the right side. Then, in step S1807, the correction unit 306 determines that the pixel adjacent to the target pixel position on the left side is the last pixel of the streak in the main scanning direction. If the correction unit 306 determines NO in step S1805 (NO in step S1805), the processing proceeds to step S1809.

The correction unit 306 performs a dust streak correction based on the streak range determined from the determination result of step S1804 and the determination result of step S1807.

In steps S1809 and S1810, the correction unit 306 repeats the processes from steps S1801 to S1808 on all of the main scanning positions until the processes on them have been completed.

The dust streak correction performed in step S1808 will be described with reference to FIG. 16.

The correction unit 306 calculates the luminance values of the pixels at the pixel positions within the streak range determined from the detection result of step S1804 and the detection result of step S1807 with use of linear interpolation from the luminance value of the adjacent pixel on the left side determined in step S1803 and the luminance value of the adjacent pixel on the right side determined in step S1806.

Figure 16:
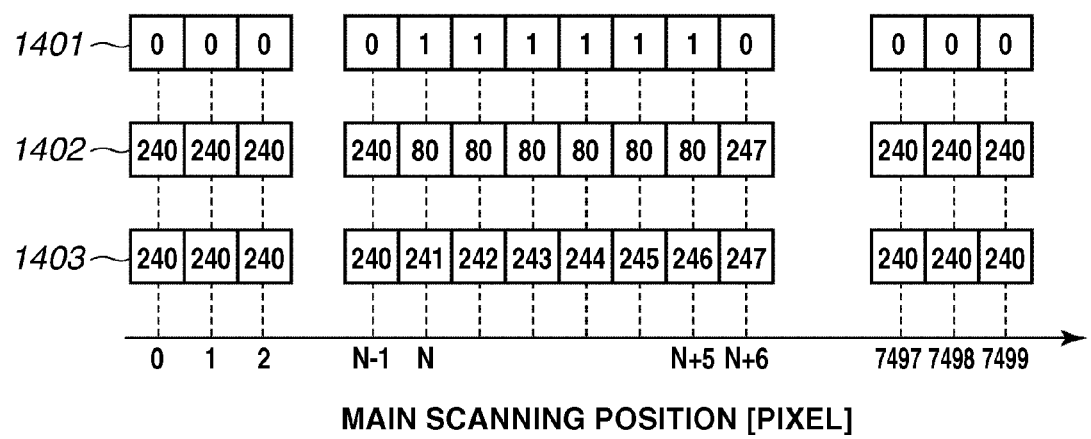
FIG. 16 illustrates an example of a dust streak correction.

In FIG. 16, the horizontal axis represents the main scanning positions of the line sensor 125. FIG. 16 illustrates a result 1403 of a dust correction performed on image data 1402 based on a streak detection result 1401 output from the width comparison unit 305.

Because "1" is set to an N pixel position to an N+5 pixel position in the streak detection result 1401, the streak range is a range from the N pixel position to the N+5 pixel position. Therefore, pixels adjacent to the streak are an N−1 pixel position and an N+6 pixel position. The correction unit 306 calculates the luminance values of the N pixel position to the N+5 pixel position from the luminance values of these two pixels, with use of linear interpolation.

The correction unit 306 calculates the luminance values I(N) to I(N+5) of the N pixel position to the N+5 pixel position with use of the following equations. In the following equations, the luminance value of the N pixel position is expressed as I(N).

$$I(N)=I(N-1)+(I(N+6)-I(N-1))\times 1/7$$

$$I(N+1)=I(N-1)+(I(N+6)-I(N-1))\times 2/7$$

$$I(N+2)=I(N-1)+(I(N+6)-I(N-1))\times 3/7$$

$$I(N+3)=I(N-1)+(I(N+6)-I(N-1))\times 4/7$$

$$I(N+4)=I(N-1)+(I(N+6)-I(N-1))\times 5/7$$

$$I(N+5)=I(N-1)+(I(N+6)-I(N-1))\times 6/7$$

The result calculated by the correction unit 306 based on the image data 1402 is the result 1403 of the dust correction.

As a result, it is possible to detect even a streak due to dust displaced on the reading position according to contact of the document 103 during conveyance of the document 103 by the streak pixel detection unit of the image reading apparatus using the automatic document feeder, and therefore it is possible to prevent generation of an abnormal image due to the streak.

In the above-described exemplary embodiment, the first dust detection unit 302 reads the white guide plate 114 before the document 103 passes through the reading position, but may perform this reading anytime as long as the document 103 is not passing through the reading position. For example, the first dust detection unit 302 may read the white guide plate 114 after the trailing edge of the document 103 has passed through the reading position, when the image reading apparatus is powered on, immediately before the image reading apparatus is powered off, or the like.

Further, in the above-described exemplary embodiment, in the process of step S402, the first dust detection unit 302 may compare the luminance value of the target pixel and a threshold value (a luminance threshold) calculated from the luminance average value of the block containing the target pixel, as illustrated in FIG. 6.

Further, in the above-described exemplary embodiment, the second dust detection unit 303 detects dust in the leading edge area of the document 103. However, the second dust detection unit 303 may detect a streak with use of a margin at the trailing edge side of the document 103. However, in this case, image data should be stored in a storage medium such as a random access memory (RAM), the image date should be read from the RAM again after the detection result is determined, and then a pixel with a streak generated thereon should be corrected.

According to the exemplary embodiment of the present invention, it is possible to appropriately set an area of a document to be read by the reading unit when determining a streak pixel position to highly accurately determine the streak pixel position.

According to the exemplary embodiment of the present invention, it is possible to highly accurately determine a streak pixel position even if the position of dust is displaced by the leading edge of a document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-150465 filed Jul. 4, 2012, which is hereby incorporated by reference herein in its entirety.

What is claimed is:

1. A document reading apparatus comprising:
   a conveyance unit configured to convey a document along a conveying path;
   a reading unit configured to read the document being conveyed by the conveyance unit at a reading position;
   an illumination unit configured to illuminate the reading position;
   a white member disposed to the reading position at the conveying path;
   a reference value determination unit configured to determine a reference value from an output value of the reading unit obtained when the reading unit reads the white member;
   a detection unit configured to detect a shadow generated by a leading edge of the document based on the reference value and an output value of the reading unit obtained before the leading edge of the document is conveyed by the conveyance unit;
   a streak pixel position determination unit configured to determine a streak pixel position based on an output value of the reading unit corresponding to a prescribed area of the document in a conveyance direction of the document, which is determined based on a detection result by the detection unit; and
   a correction unit configured to perform a streak correction on an output value of the reading unit based on the streak pixel position.

2. The document reading apparatus according to claim 1, further comprising a first streak pixel candidate determination unit configured to determine a first streak pixel candidate based on an output value of the reading unit obtained when the reading unit reads the white member,
   wherein the streak pixel position determination unit includes:
       a second streak pixel candidate determination unit configured to determine a second streak pixel candidate from the output value of the reading unit corresponding to the prescribed area of the document in the conveyance direction of the document, which is determined based on the detection result by the detection unit; and
       a determination unit configured to determine the streak pixel position based on the first streak pixel candidate and the second streak pixel candidate.

3. The document reading apparatus according to claim 1, wherein the detection unit detects the shadow at a plurality of pixel positions in a direction perpendicular to the conveyance direction.

4. The document reading apparatus according to claim 1, wherein the reference value determination unit determines the reference value corresponding to a target pixel position in a direction perpendicular to the conveyance direction based on a luminance value of a pixel at the target pixel position and luminance values of pixels positioned around the target pixel position.

5. The document reading apparatus according to claim 1, wherein the illumination unit illuminates the reading position from an upstream side of the reading position in the conveyance direction.

6. A document reading apparatus comprising:
a conveyance unit configured to convey a document along a conveying path;
a reading unit configured to read the document being conveyed by the conveyance unit at a reading position;
an illumination unit configured to illuminate the reading position;
a white member disposed to the reading position at the conveying path;
a first streak pixel candidate determination unit configured to determine a first streak pixel candidate based on an output value of the reading unit obtained when the reading unit reads the white member;
a second streak pixel candidate determination unit configured to determine a second streak pixel candidate based on an output vale of the reading unit obtained when the reading unit reads the document;
a determination unit configured to determine a streak pixel position based on the first streak pixel candidate and the second streak pixel candidate; and
a correction unit configured to perform a streak correction on an output value of the reading unit based on the streak pixel position,
wherein the determination unit determines the streak pixel position based on a position of the first streak pixel candidate and a position of the second streak pixel candidate, and
wherein, even if a streak position of the first streak pixel candidate and a streak position of the second streak pixel candidate are different from each other, as long as a difference between the streak position of the first streak pixel candidate and the streak position of the second streak pixel candidate is within a predetermined range, the determination unit sets the streak position of the second streak pixel candidate as the streak pixel position.

7. The document reading apparatus according to claim 6, wherein the determination unit further determines the streak pixel position based on a streak width of the first streak pixel candidate and a streak width of the second streak pixel candidate, and
wherein, even if the streak width of the first streak pixel candidate and the streak width of the second streak pixel candidate are different from each other, as long as a difference between the streak width of the first streak pixel candidate and the streak width of the second streak pixel candidate is within a predetermined range, the determination unit further sets the streak position of the second streak pixel candidate as the streak pixel position.

8. An image processing method for a document reading apparatus including a conveyance unit configured to convey a document along a conveying path, a reading unit configured to read the document being conveyed by the conveyance unit at a reading position, an illumination unit configured to illuminate the reading position, and a white member disposed to the reading position at the conveying path, the image processing method comprising:
determining a reference value based on an output value of the reading unit obtained when the reading unit reads the white member;
detecting a shadow generated by a leading edge of the document based on the reference value and an output value of the reading unit obtained before the leading edge of the document is conveyed by the conveyance unit;
determining a streak pixel position based on an output value of the reading unit corresponding to a position of the document in a conveyance direction of the document, which is determined based on a detection result of the shadow; and
performing a streak correction on an output value of the reading unit based on the streak pixel position.

9. The image processing method according to claim 8, further comprising:
determining a first streak pixel candidate based on an output value of the reading unit obtained when the reading unit reads the white member;
determining a second streak pixel candidate based on the output value of the reading unit corresponding to the position of the document in the conveyance direction of the document, which is determined based on a detection result of the shadow; and
determining the streak pixel position from the first streak pixel candidate and the second streak pixel candidate.

10. The image processing method according to claim 8, further comprising detecting the shadow at a plurality of pixel positions in a direction perpendicular to the conveyance direction.

11. The image processing method according to claim 8, further comprising determining the reference value corresponding to a target pixel position in a direction perpendicular to the conveyance direction from a luminance value of a pixel at the target pixel position and luminance values of pixels positioned around the target pixel position.

12. An image processing method for a document reading apparatus including a conveyance unit configured to convey a document along a conveying path, a reading unit configured to read the document being conveyed by the conveyance unit at a reading position, an illumination unit configured to illuminate the reading position, and a white member disposed to the reading position at the conveying path, the image processing method comprising:
determining a first streak pixel candidate based on an output value of the reading unit obtained when the reading unit reads the white member;
determining a second streak pixel candidate based on an output vale of the reading unit obtained when the reading unit reads the document;
determining a streak pixel position based on the first streak pixel candidate and the second streak pixel candidate;
performing a streak correction on an output value of the reading unit based on the streak pixel position; and
determining the streak pixel position based on a position of the first streak pixel candidate and a position of the second streak pixel candidate, and, even if a streak position of the first streak pixel candidate and a streak position of the second streak pixel candidate are different from each other, as long as a difference between the streak position of the first streak pixel candidate and the streak position of the second streak pixel candidate is within a predetermined range, setting the streak position of the second streak pixel candidate as the streak pixel position.

13. The image processing method according to claim 12, further comprising:

determining the streak pixel position based on a streak width of the first streak pixel candidate and a streak width of the second streak pixel candidate; and even if the streak width of the first streak pixel candidate and the streak width of the second streak pixel candidate are different from each other, as long as a difference between the streak width of the first streak pixel candidate and the streak width of the second streak pixel candidate is within a predetermined range, setting the streak position of the second streak pixel candidate as the streak pixel position.

\* \* \* \* \*